(12) United States Patent
Lee (10) Patent No.: US 7,068,342 B1
(45) Date of Patent: Jun. 27, 2006

(54) LIQUID CRYSTAL DISPLAY PANEL AND METHOD FOR FABRICATING THE SAME

(75) Inventor: Ming-Shu Lee, Taipei County (TW)

(73) Assignee: Chunghwa Picture Tubes. Ltd., Taipei (TW)

( * ) Notice: Subject to any disclaimer, the term of this patent is extended or adjusted under 35 U.S.C. 154(b) by 0 days.

(21) Appl. No.: 10/906,708

(22) Filed: Mar. 3, 2005

(51) Int. Cl.
*G02F 1/1368* (2006.01)
*G02F 1/1339* (2006.01)

(52) U.S. Cl. .................... 349/155; 349/157; 349/187

(58) Field of Classification Search .............. 349/155, 349/156, 157, 187
See application file for complete search history.

(56) References Cited

U.S. PATENT DOCUMENTS 6,734,945 B1 * 5/2004 Nakayoshi et al. ......... 349/155
6,975,379 B1 * 12/2005 Kim et al. .................. 349/155
2005/0041194 A1 * 2/2005 Lee et al. .................... 349/155

\* cited by examiner

*Primary Examiner*—Toan Ton
*Assistant Examiner*—Tai Duong
(74) *Attorney, Agent, or Firm*—Jianq Chyun IP Office (57) ABSTRACT

A liquid crystal display panel and a method for fabricating the same are provided. The liquid crystal display panel comprises an active device array, a front substrate, at least one first spacer, and a liquid crystal layer. Wherein, the front substrate is disposed over the active device array. The first spacer is disposed between the front substrate and the active device array, and is partially embedded into an opening formed on the active device array. In addition, the liquid crystal layer is disposed between the front substrate and the active device array. Since the first spacer is embedded into the opening, the misalignment between the front substrate and the active device array can be effectively prevented, and the abnormal display due to the misalignment causing by external force can therefore be prevented.

14 Claims, 8 Drawing Sheets

LIQUID CRYSTAL DISPLAY PANEL AND METHOD FOR FABRICATING THE SAME

BACKGROUND OF THE INVENTION

1. Field of the Invention

The present invention generally relates to a display apparatus and a method for fabricating the same. More particularly, the present invention relates to a liquid crystal display panel and a method for fabricating the same.

2. Description of Related Art

As multi-media technology advances, a variety of semiconductor devices or displays have been rapidly developed. The thin film transistor liquid crystal display (TFT LCD) has such advantages as high resolution, high space-effectiveness, low power consumption and no radiation, and has become the main trend in this industry.

Figure 1:
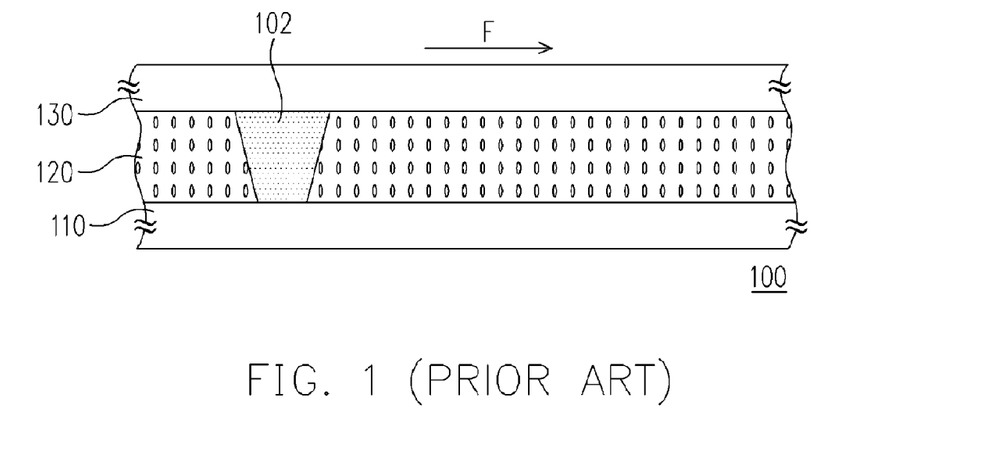
FIG. 1 is a cross-sectional view schematically illustrating a conventional liquid crystal display panel.

FIG. 1 is a cross-sectional view schematically illustrating a conventional liquid crystal display panel. Referring to FIG. 1, the conventional liquid crystal display panel 100 comprises a bottom substrate 110, an upper substrate 130, and a liquid crystal layer 120 sealed by a sealant (not shown) between the bottom substrate 110 and the upper substrate 130. In addition, a cell gap d concerning the property such as responding speed, contrast, and view angle of a liquid crystal display is strictly controlled according to the optical property of the liquid crystal material. Specifically, the non-uniform cell gap d may seriously affect the display quality and diminish the visibility of images. In general, spacers 102 are disposed between the bottom substrate 110 and the upper substrate 130 for maintaining the cell gap d.

Conventionally, the spacers 102 are formed during the fabricating process of the upper substrate 130 and thus called 'spacers on color filter' (SOC). Since the spacers 102 is directly contacted with the bottom substrate 110 without any adhesion layer, a misalignment between the upper substrate 130 and the bottom substrate 110 may occur as applying an external transverse force F onto the liquid crystal display panel 100. Consequently, the display quality of the liquid crystal display panel 100 is reduced.

SUMMARY OF THE INVENTION

Accordingly, the present invention is directed to a liquid crystal display panel which has a uniform cell gap.

The present invention is also directed to a method for fabricating the liquid crystal display panel, for increasing the allowance of liquid crystal and preventing the light leakage due to the misalignment of the liquid crystal display panel after being assembled.

The present invention provides a liquid crystal display panel, comprising an active device array, a front substrate, at least one first spacer, and a liquid crystal layer. Wherein, the active device array comprises a substrate; a plurality of scan lines, disposed on the substrate; a plurality of data lines, disposed on the substrate, wherein a plurality of pixel regions are defined by the scan lines and the data lines on the substrate, and the scan lines and/or the data lines have at least one opening; a plurality of active devices, disposed in the pixel regions respectively and coupled to the corresponding scan lines and the corresponding data lines; and a plurality of pixel electrodes, disposed in the pixel regions respectively and coupled to the corresponding active devices. In addition, the front substrate is disposed over the active device array. The first spacer is disposed between the front substrate and the active device array and partially embedded into the opening. The liquid crystal layer is disposed between the front substrate and the active device array.

According to an embodiment of the present invention, the first spacer takes a pillar shape.

According to an embodiment of the present invention, the liquid crystal display panel further comprises at least one second spacer, which is disposed between the front substrate and the scan lines and/or the data lines. In addition, the second spacer may take a pillar shape.

According to an embodiment of the present invention, the depth of the opening is less than the maximum elastic deformation of the second spacer. For example, the depth of the opening may be less than 0.25 µm.

According to an embodiment of the present invention, the bottom area of the opening is at least two-thirds of the contact area between the first spacer and the front substrate.

According to an embodiment of the present invention, the front substrate comprises a color filter.

According to an embodiment of the present invention, the active devices are thin film transistors (TFT).

The present invention also provides a method for fabricating a liquid crystal display panel. First, an active device array is provided. The active device array comprises a substrate, a plurality of scan lines, a plurality of data lines, a plurality of active devices, and a plurality of pixel electrodes, wherein the scan lines and/or the data lines have at least one opening. A plurality of pixel regions, in which the active devices are disposed respectively, are defined by the scan lines and the data lines on the substrate. Then, at least one first spacer and at least one second spacer are formed on the front substrate. Next, a liquid crystal layer is formed on the active device array. After that, the front substrate is disposed over the active device array and the first spacer is partially embedded into the opening.

According to an embodiment of the present invention, the method further comprises a step of forming a sealant on the active device array to define a liquid crystal injection region before forming the liquid crystal layer.

According to an embodiment of the present invention, the front substrate is disposed over the active device array by performing the following steps. First, the front substrate is arranged over the active and the first spacer is aimed at the opening. Next, the active device array and the front substrate are assembled. Then, the sealant is cured.

According to an embodiment of the present invention, the sealant can be cured by ultraviolet or thermal.

According to an embodiment of the present invention, the active device array is a thin film transistor (TFT) array and the front substrate comprises a color filter.

According to an embodiment of the present invention, the active device array comprises a color filter on array (COA) substrate. In addition, the front substrate comprises a substrate and a common electrode disposed thereon.

Since the opening is formed in the process of fabricating the scan lines and/or the data lines, the first spacer disposed on the front substrate can be partially embedded into the opening as assembling the liquid crystal display panel. Therefore, the misalignment between the front substrate and the active device array can be effectively prevented even an external transverse force is applied on the front substrate. The present invention resolves the problem of abnormal display due to the misalignment between the front substrate and the active device array without any additional processing mask.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2:
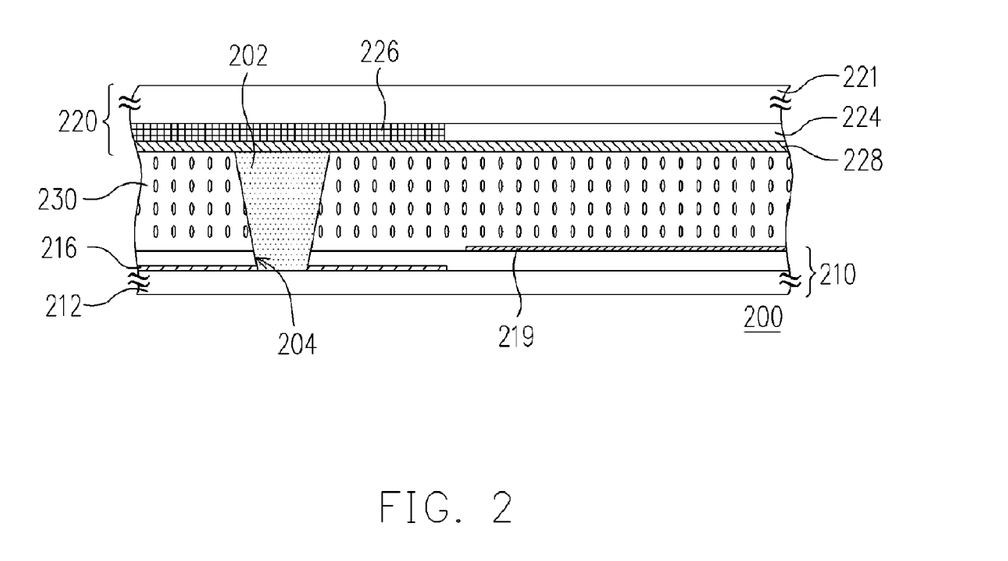
FIG. 2 is a cross-sectional view schematically illustrating a liquid crystal display panel according to one embodiment of the present invention.
Figure 3:
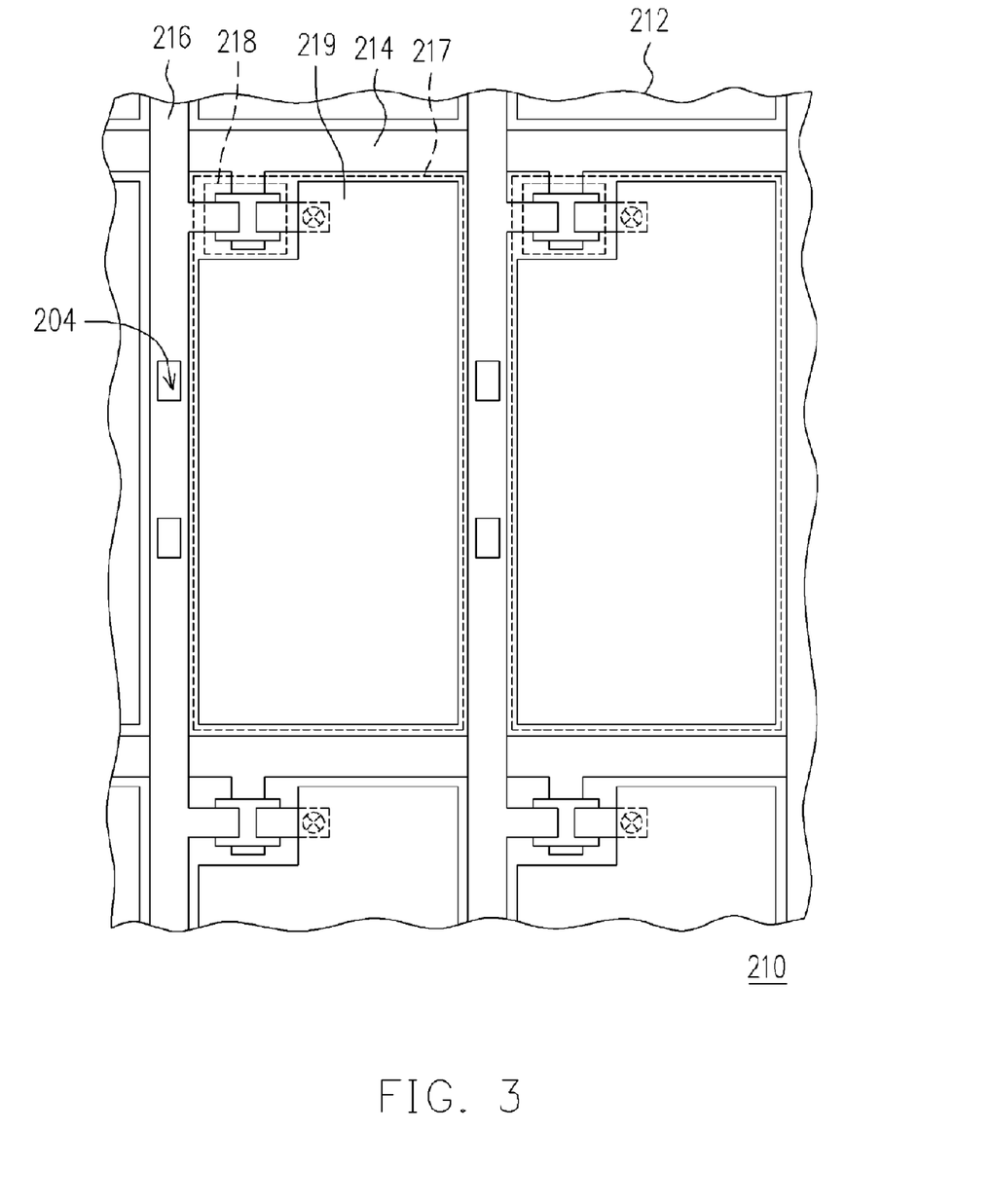
FIG. 3 is a top view of an active device array 210 illustrated in FIG. 2.

FIG. 2 is a cross-sectional view schematically illustrating a liquid crystal display panel according to one embodiment of the present invention. FIG. 3 is a top view of an active device array 210 illustrated in FIG. 2. Referring to FIGS. 2 and 3, the liquid crystal 200 comprises the active device array 210, a front substrate 220, a first spacer 202, and a liquid crystal layer 230. Wherein, the active device array 210 may be a thin film transistor (TFT) array, which comprises a substrate 212, a plurality of scan lines 214, a plurality of data lines 216, a plurality of active devices 218, and a plurality of pixel electrodes 219. The scan lines 214 and the data lines 216 are disposed on the substrate 212, and defines a plurality of pixel regions 217 on the substrate 212.

Referring to FIGS. 2 and 3, the data lines 216 has openings 204, which are formed with the data lines 216 by the same process. Particularly, the distance between an opening 204 and the corresponding pixel electrode 219 may be greater than 3 μm for preserving the aperture ratio of the liquid crystal display panel 200. In addition, the active devices 218 may be thin film transistors. Each active device 218 is disposed in one of the pixel regions 217, and coupled to the corresponding scan line 214 and the corresponding data line 216. The pixel electrodes 219 are disposed in the pixel regions 217 and coupled to the corresponding active devices 218 respectively.

Referring to FIG. 2, the front substrate 220 is disposed over the active device array 210. In this embodiment, the front substrate 220 may be a color filter, which comprises a substrate 221, a plurality of color filter films 224, a black matrix (BM) 226, and a common electrode 228. Wherein, the color filter films 224 and the black matrix 226 are disposed on the substrate 221 and covered with the common electrode 228.

Referring to FIG. 2, the first spacers 202 are disposed between the front substrate 220 and the active device array 210. Wherein, the first spacers 202 are partially embedded into the openings 204 respectively. It should be noted that, instead of ball shape spacers, the first spacers 202 of the embodiment take pillar shapes for a more uniform cell gap, a higher light-transmittance, and a superior contrast. Particularly, the bottom area of each opening 204 is at least two-thirds of the contact area between the corresponding first spacer 202 and the front substrate 220, so as to fix the corresponding first spacer 202 effectively.

Figure 4:
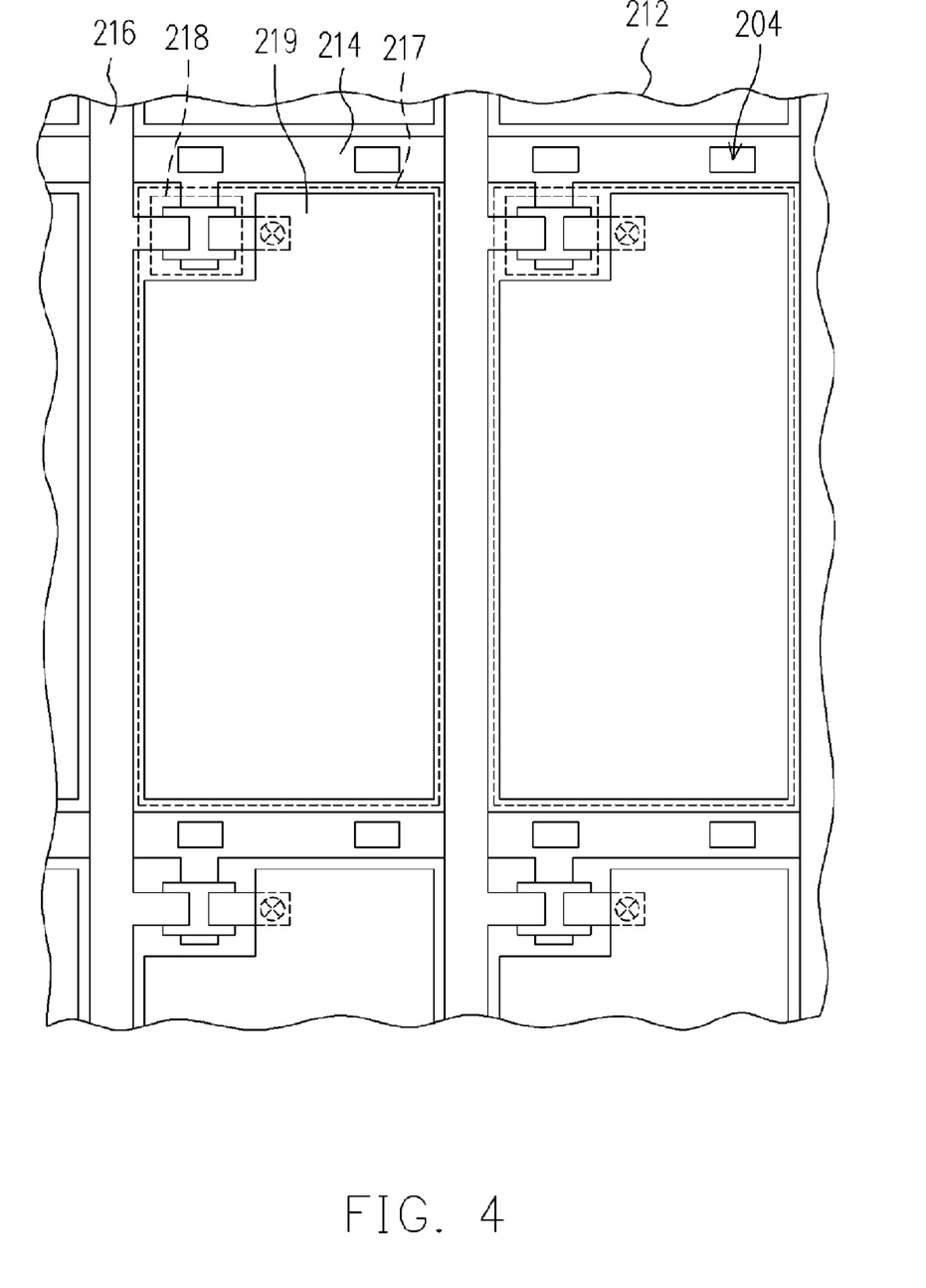
FIG. 4 and FIG. 5 are top views schematically illustrating active device arrays of liquid crystal display panels according to other embodiments of the present invention.
Figure 5:
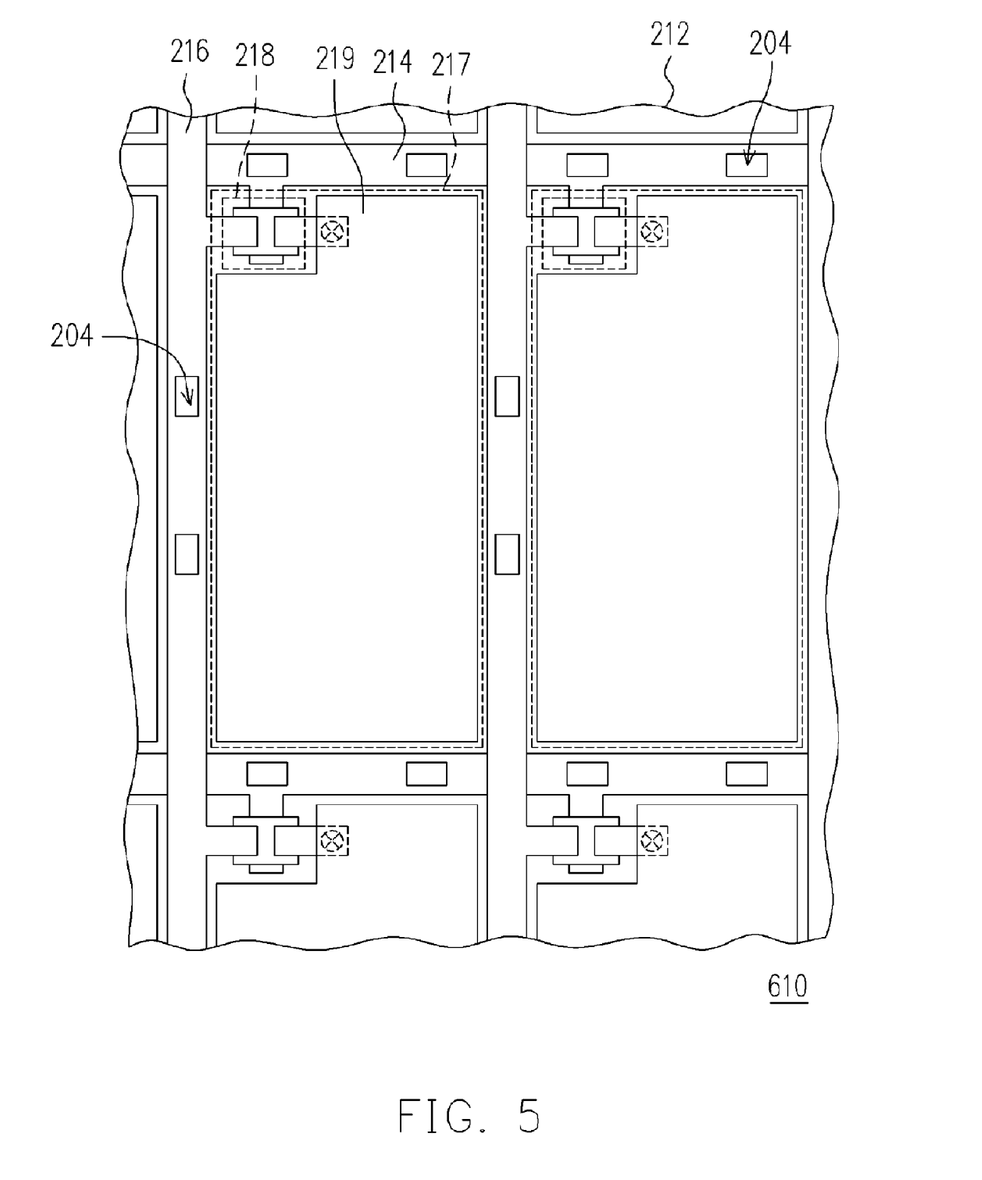

Accordingly, the openings 204 are formed on positions, such as on the data lines 216, which make no effect on the aperture ratio of the liquid crystal display panel 200. Therefore, the abnormal display due to the misalignment between the active device array 210 and the front substrate caused by an external force applied on the liquid crystal display panel 200 can be prevented. It should be noted that, in another embodiment as shown in FIG. 4, the openings 204 can be formed on the scan lines 214, which make no effect on the aperture ratio of the liquid crystal display panel 200 either. Furthermore, as shown in FIG. 5, the openings 204 can be formed on both the data lines 216 and the scan lines 214.

Figure 6:
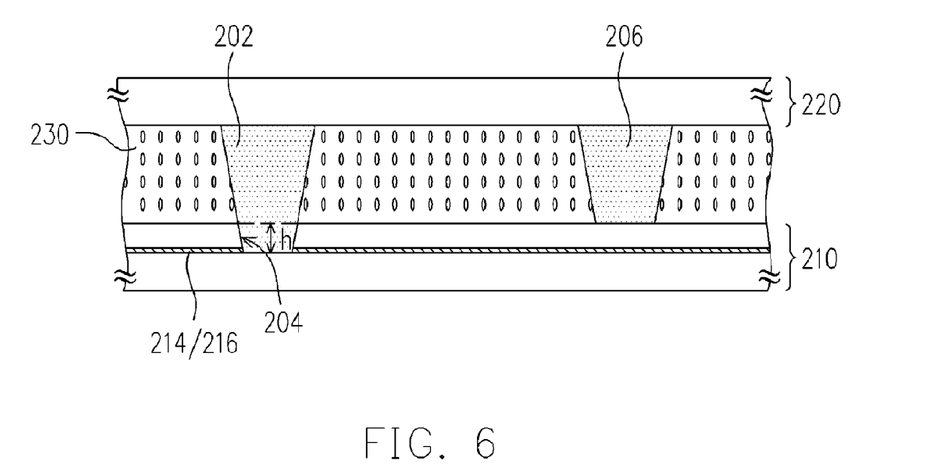
FIG. 6 is a cross-sectional view schematically illustrating a liquid crystal display panel according to another embodiment of the present invention.

FIG. 6 is a cross-sectional view schematically illustrating a liquid crystal display panel according to another embodiment of the present invention. Referring to FIG. 6, the liquid crystal display panel of the present invention further comprises second spacers 206 for providing superior rigidity. Wherein, the second spacers 206 are disposed between the active device array 210 and the front substrate 220. Specifically, the second spacers 206 are disposed between the front substrate 220 and the scan lines 214 and/or the data lines 216.

It should be noted that the second spacers 206 are not embedded into the openings 204 of the scan lines 214 and/or the data lines 216. It will be apparent to those skilled in the art that since the first spacers 202 and the second spacers 206 are generally made of elastic material, the second spacers 206 deform and produce a difference in heights of the first spacers 202 and the second spacers 206, which is equal to the depth h of the openings 204, as assembling the active device array 210 and the front substrate 220. For preventing a plastic deformation of the second spacers 206 and an aggravation of the non-uniform cell gap of the display panel 700, the deformation of the second spacers 206 should be within the range of an elastic deformation. In other words, the depth h of the openings 204 may be less than the maximum elastic deformation of the second spacers 206. For example, the depth h of the openings 204 is less than 0.25 μm as the maximum elastic deformation of the second spacers 206.

Accordingly, after the liquid crystal display panel 700 has been assembled, a difference in height is produced between the first spacers 202 and the second spacers 206. Thus, forming the liquid crystal layer 230 of the liquid crystal display panel 700 by the technique of one drop fill (ODF) improves the allowance of liquid crystal and prevents misalignment as assembling the liquid crystal display panel 700. A process of a liquid crystal display panel having spacers in different heights is described in the following. Wherein, the active device array of the liquid crystal display panel may similar to those shown in FIG. 3, 4 or 5. Though the active device array shown in FIG. 5 is selected as an example for the following description, there is no set limit on the present invention.

Referring to FIG. 5, an active device array 610 is provided first, wherein the active device array 610 may be a thin film transistor (TFT) array. The active device array 610 is substantially similar to the active device array 210 shown in FIG. 3, besides a difference that both the scan lines 214 and data lines 216 of the active device array 610 have the openings 204. Therefore, a detailed description of the active device array 610 will not be repeated.

Figure 7A:
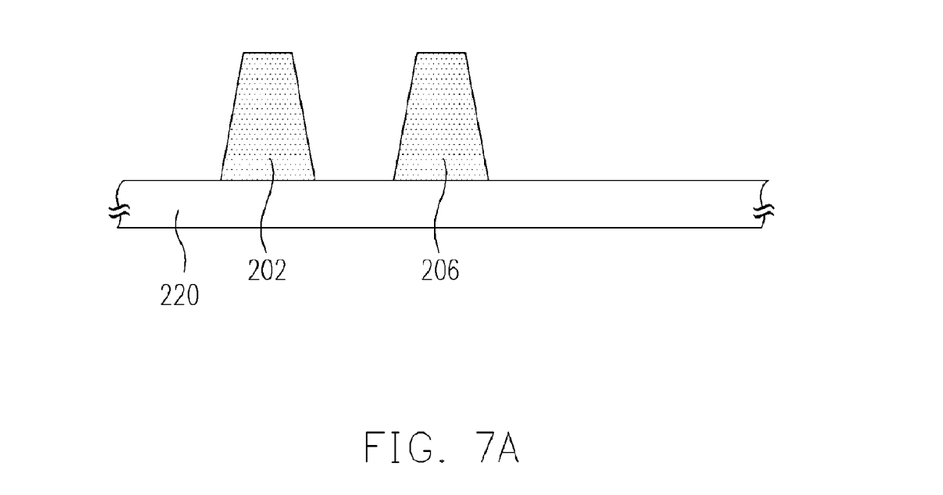
FIGS. 7A through 7D are schematic cross-sectional views showing a fabricating process of a liquid crystal display panel according to one embodiment of the present invention.

Then, referring to FIG. 7A, first spacers 202 and second spacers 206 are formed on a front substrate 220, wherein the first spacers 202 and the second spacers 206 may be made of elastic material. It should be noted that the amounts of the first spacers 202 and the second spacers 206 are not limited in the present invention, and the proper amounts can be decided by those skilled in the art as preferred according to a necessary. In addition, the front substrate 220 may be a color filter as shown in FIG. 2. In this case, the first spacers 202 and the second spacers 206 are formed over the black matrix 226 (as shown in FIG. 2), thus the aperture of the liquid crystal display is preserved.

Figure 7B:
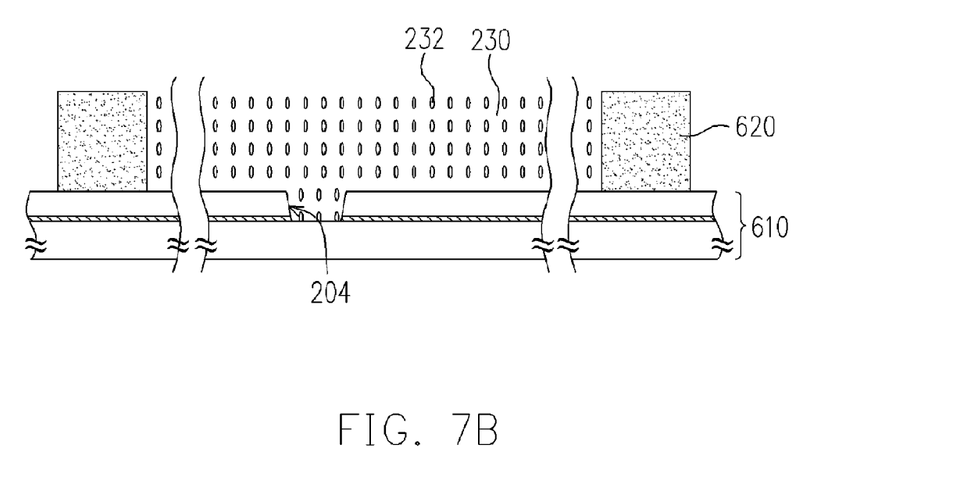
Figure 8:
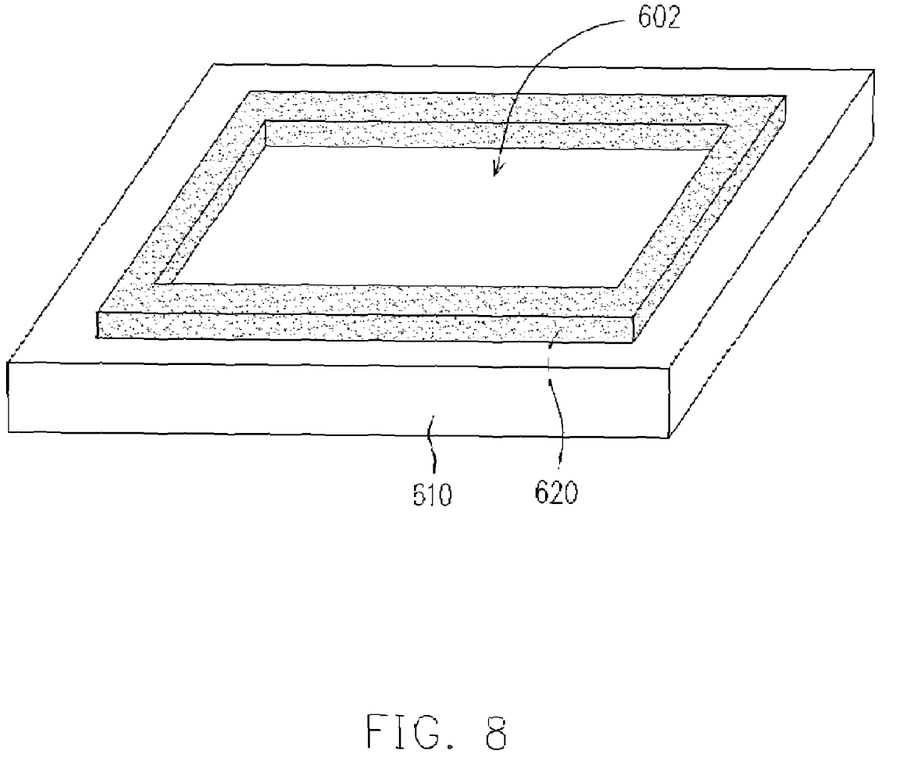
FIG. 8 is a three dimensional view schematically illustrating the sealant, which is disposed on the active device array as shown in FIG. 7B.

Next, referring to FIG. 7B, a liquid crystal layer 230 is formed on the active device array 610. It should be noted that a sealant 620 should be formed first to define a liquid crystal injection region 602 (as shown in FIG. 8) on the active device array 610 before forming the liquid crystal layer 230. Thus, liquid crystal molecules 232 are filled into the liquid crystal injection region 602 by the technique of one drop fill (ODF) to form the liquid crystal layer 230, which will sealed between the active device array 610 and the front substrate 220 in the following process.

Figure 7C:
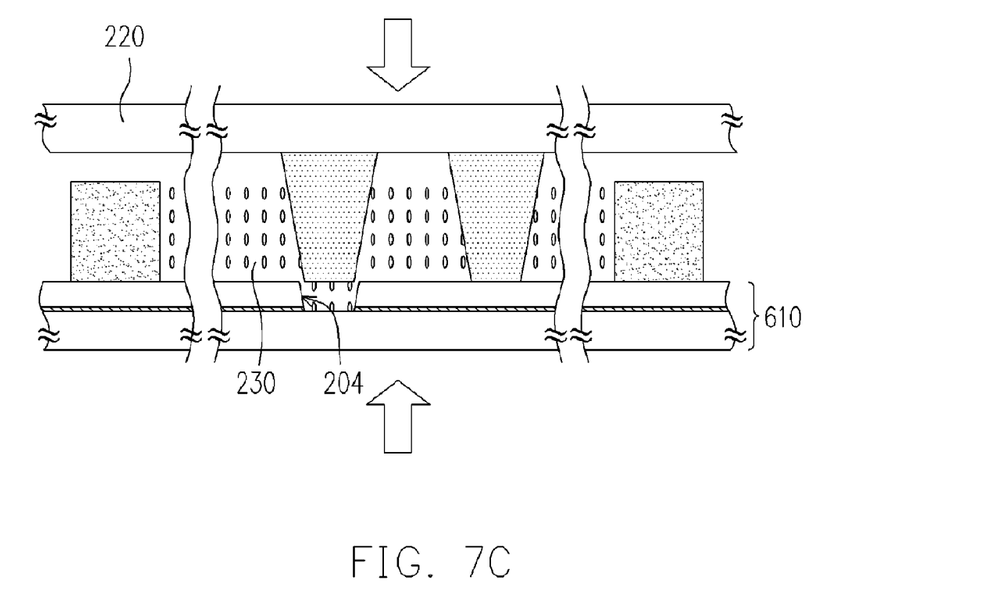

Afterwards, referring to FIG. 7C, the front substrate 220 is disposed over the active device array 610, wherein the first spacers 202 are corresponding to the openings 204. Then, referring to FIG. 7D, the front substrate 220 and the active device array 610 are assembled, and the first spacers 202 are partially embedded into the openings 204. Wherein, each second spacer 206 has a deformation equal to the depth h of the openings 204. According to the embodiment mentioned above, the depth h of the openings 204 may be less than the maximum elastic deformation of the second spacers 206.

Figure 7D:
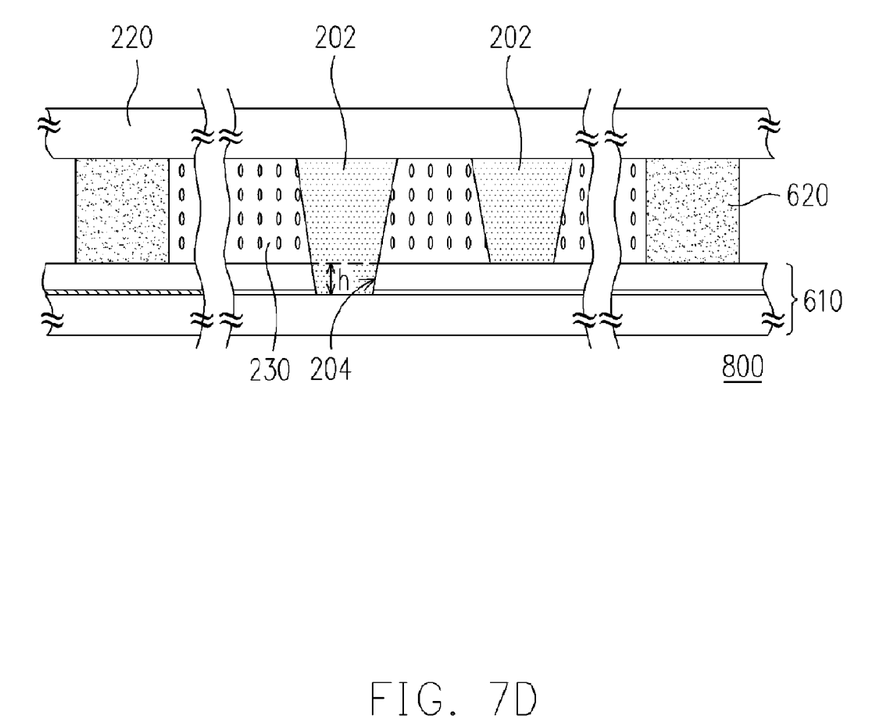

Specifically, due to the difference in heights of the first spacers 202 and the second spacers 206 produced after assembling the active device array 610 and the front substrate 220, the allowance of liquid crystal increases and can be applied to different structural designs. The processing yields of the liquid crystal display panel can therefore be improved. For example, for a 20 inch liquid crystal display panel, the active device array 610 having openings 204 can increase the allowance of liquid crystal in 20%.

After that, the sealant 620 is cured for fixing the relative positions of the active device array 610 and the front substrate 220. Thus, the process for fabricating the liquid crystal panel is completed. Wherein, the sealant 620 can be cured by thermal or ultraviolet (UV) according to the material property thereof. Since the following process of the liquid crystal display panel 800 is apparent to those skilled in the art, a detailed description will not be repeated.

In summary, the present invention has at least the following advantages.

1. Openings are formed on the active device array for containing the first spacers on the front substrate after the liquid crystal display panel is assembled. Thus, the misalignment between the front substrate and the active device array can be effectively prevented even an external transverse force is applied on the front substrate. The abnormal display due to the misalignment can therefore be prevented.

2. The scan lines and/or the data lines and the openings thereof are formed in the same process. In other words, the present invention forms the openings on the active device array without any additional processing mask.

3. The present invention disposes the first spacers and the second spacers on the front substrate for improving the rigidity of the liquid crystal display panel, wherein the first spacers are corresponding to the openings. Due to the difference in heights of the first spacers and the second spacers produced after assembling the active device array and the front substrate, the allowance of liquid crystal increases and can be applied to different structural designs. The processing yields of the liquid crystal display panel can therefore be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   an active device array, comprising:
      a substrate;
      a plurality of scan lines, disposed on the substrate;
      a plurality of data lines, disposed on the substrate, wherein a plurality of pixel regions are defined by the scan lines and the data lines on the substrate, and the scan lines and/or the data lines have at least one opening;
      a plurality of active devices, disposed in the pixel regions respectively and coupled to the corresponding scan lines and the corresponding data lines;
      a plurality of pixel electrodes, disposed in the pixel regions respectively and coupled to the corresponding active devices;
   a front substrate, disposed over the active device array;
   at least one first spacer, disposed between the front substrate and the active device array and partially embedded into the opening; and
   a liquid crystal layer, disposed between the front substrate and the active device array.

2. The liquid crystal display panel according to claim 1, wherein the first spacer takes a pillar shape.

3. The liquid crystal display panel according to claim 1, further comprising at least one second spacer, disposed between the front substrate and the scan lines and/or the data lines.

4. The liquid crystal display panel according to claim 3, wherein the second spacer takes a pillar shape.

5. The liquid crystal display panel according to claim 3, wherein the depth of the opening is less than the maximum elastic deformation of the second spacer.

6. The liquid crystal display panel according to claim 5, wherein the depth of the opening is less than 0.25 μm.

7. The liquid crystal display panel according to claim 1, wherein the bottom area of the opening is at least two-thirds of the contact area between the first spacer and the front substrate.

8. The liquid crystal display panel according to claim 1, wherein the front substrate comprises a color filter.

9. The liquid crystal display panel according to claim 1, wherein the active devices are thin film transistors (TFT).

10. A method for fabricating a liquid crystal display panel, comprising:
   providing an active device array, which comprises a substrate, a plurality of scan lines, a plurality of data lines, a plurality of active devices, and a plurality of pixel electrodes, wherein the scan lines and/or the data lines have at least one opening, and a plurality of pixel regions, in which the active devices are disposed respectively, are defined by the scan lines and the data lines on the substrate;
   forming at least one first spacer and at least one second spacer on the front substrate;
   forming a liquid crystal layer on the active device array; and
   disposing the front substrate over the active device array and partially embedding the first spacer into the opening.

11. The method according to claim 10, further comprising forming a sealant on the active device array to define a liquid crystal injection region before forming the liquid crystal layer.

12. The method according to claim 11, wherein the steps of disposing the front substrate over the active device array comprise:
   arranging the front substrate over the active and aiming the first spacer at the opening;
   assembling the active device array and the front substrate; and
   curing the sealant.

13. The method according to claim 12, wherein the sealant is cured by ultraviolet or thermal.

14. The method according to claim 10, wherein the active device array is a thin film transistor (TFT) array and the front substrate comprises a color filter.

* * * * *